US010639654B2

(12) United States Patent
Todd et al.

(10) Patent No.: US 10,639,654 B2
(45) Date of Patent: May 5, 2020

(54) GYPSUM SLURRY APPLICATION MODIFIER (71) Applicant: UNITED STATES GYPSUM COMPANY, Chicago, IL (US)

(72) Inventors: Brad Todd, Hainesville, IL (US); William Rago, Gurnee, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 211 days.

(21) Appl. No.: 15/203,283

(22) Filed: Jul. 6, 2016

(65) Prior Publication Data
US 2018/0008993 A1 Jan. 11, 2018

(51) Int. Cl.
B05B 1/32 (2006.01)
B05B 15/68 (2018.01)
F16L 3/227 (2006.01)
F16K 7/06 (2006.01)
B28B 19/00 (2006.01)
B01F 15/02 (2006.01)
F16L 3/00 (2006.01)
F16L 3/10 (2006.01)
B05B 7/14 (2006.01)

(52) U.S. Cl.
CPC .......... B05B 1/326 (2013.01); B01F 15/0297 (2013.01); B05B 15/68 (2018.02); B28B 19/0092 (2013.01); F16K 7/061 (2013.01); F16L 3/003 (2013.01); F16L 3/1091 (2013.01); F16L 3/227 (2013.01); B01F 2215/0047 (2013.01); B05B 7/149 (2013.01)

(58) Field of Classification Search
CPC ......... F16L 3/227; F16L 3/003; F16L 3/1091; F16K 7/061; B01F 15/0297; B01F 2215/0047; B05B 1/326; B05B 12/16; B28B 19/0092
See application file for complete search history.

(56) References Cited

U.S. PATENT DOCUMENTS 582,027 A * 5/1897 Smith ..................... F16K 7/061
                                                           251/8
1,363,967 A * 12/1920 Fulton .................. B05B 15/622
                                                           239/276

(Continued)

FOREIGN PATENT DOCUMENTS

EP          1741965          1/2007

OTHER PUBLICATIONS

International Search Report from International Patent Application No. PCT/US20171039703, dated Sep. 15, 2017.

Primary Examiner — Cody J Lieuwen
Assistant Examiner — Qingzhang Zhou
(74) Attorney, Agent, or Firm — Greer, Burns & Crain Ltd.

(57) ABSTRACT

A gypsum slurry modifier device is provided for use with a gypsum mixer outlet boot having at least one tubular outlet leg, and includes a support bracket mountable to the outlet boot; at least one clamp member associated with the support bracket and constructed and arranged for engaging the at least one tubular outlet leg of the outlet boot. Each at least one clamp member is constructed and arranged for exerting a vertical compression force on the associated at least one tubular outlet leg for expanding a slurry outlet flow from the at least one leg laterally beyond an exterior surface of the leg.

10 Claims, 10 Drawing Sheets (56) References Cited

U.S. PATENT DOCUMENTS

| | | | | |
|---|---|---|---|---|
| 1,960,472 A | * | 5/1934 | Balaam | A01G 25/00 137/236.1 |
| 2,865,591 A | * | 12/1958 | Holinshead | A61M 39/283 24/135 N |
| 2,985,219 A | | 5/1961 | Summerfield | |
| 3,021,860 A | * | 2/1962 | Gandy | A01G 25/00 137/124 |
| 3,498,541 A | * | 3/1970 | Johnston | B05B 1/042 239/546 |
| 3,532,576 A | | 10/1970 | Proctor et al. | |
| 3,832,250 A | | 8/1974 | Pearson | |
| 3,844,516 A | * | 10/1974 | Klarke | A62C 33/04 248/88 |
| 4,345,887 A | | 8/1982 | Lanneau et al. | |
| 4,354,885 A | | 10/1982 | White | |
| 4,364,790 A | | 12/1982 | Delcoigne et al. | |
| 4,488,917 A | | 12/1984 | Porter et al. | |
| 5,350,290 A | | 9/1994 | Honings | |
| 6,446,915 B1 | | 9/2002 | Ismert | |
| 8,475,762 B2 | | 7/2013 | Li et al. | |
| 2010/0180779 A1 | * | 7/2010 | Oki | A21C 5/00 99/537 |
| 2012/0012715 A1 | | 1/2012 | Andersen et al. | |
| 2013/0098268 A1 | | 4/2013 | Li et al. | |
| 2015/0231799 A1 | | 8/2015 | Wittbold et al. | |

\* cited by examiner

GYPSUM SLURRY APPLICATION MODIFIER

BACKGROUND

The present invention relates to the production of gypsum wallboard, and more specifically, to devices for modifying the flow of gypsum slurry upon a moving conveyor line.

It is well known to produce gypsum products (i.e., products comprising calcium sulfate dihydrate) from starting materials comprising calcined gypsum (i.e., calcium sulfate hemihydrate) and water. A popular application of gypsum chemistry is in the production of gypsum wallboard panels. The basic technology of gypsum wallboard panel manufacture is disclosed in U.S. Pat. Nos. 1,500,452; 2,207,339 and 4,009,062 all of which are incorporated by reference. In this process, calcined gypsum is uniformly dispersed in water to form a slurry, and then the slurry is deposited upon a continuously moving web of facing paper located on a conveyor line. After deposit upon the face paper, a top layer of backing paper is deposited upon the slurry, which is then cast into a desired shape and allowed to set to form hardened gypsum by reaction of the calcined gypsum (calcium sulfate hemihydrite or anhydrite) with the water to form hydrated gypsum (calcium sulfate dihydrate). As is well known in the art, after the panels are formed, they are heated to dry the excess water, and cut into building panels.

It is also well known to produce a lightweight gypsum product by uniformly mixing an aqueous foam into the slurry to produce air bubbles. This will result in a uniform distribution of voids in the set gypsum product if the bubbles do not escape from the slurry before the hardened gypsum forms. The voids lower the density of the final product, which is often referred to as "foamed gypsum."

A gypsum wallboard mixer typically includes a housing defining a mixing chamber with inlets for receiving calcined gypsum and water, as well as other additives well known in the art, including but not limited to foam. The mixer usually includes an impeller or other type of rotating agitator for agitating the contents to be mixed into a mixture or slurry.

In some gypsum wallboard production techniques, a first, outer layer of relatively higher density slurry and less foam is first deposited upon the moving web of face paper, for creating a relatively durable outer region of the panel, and is then followed by a relatively lower density slurry formulated for creating the core of the wallboard panel. The higher density outer layer has been found to be more resistant to "nail pull," which is the force needed to pull the wallboard panel over the head of a nail used to fasten the board to an underlying wooden frame. Also, in some cases, a last, backing layer of relatively high density slurry is then deposited upon the core layer.

It has been found that it is desirable to reduce the pressure of the slurry in the slurry conduit before the slurry leaves the conduit outlet in order to avoid disrupting the distribution of the previously deposited slurry in a wallboard production line. This is accomplished by providing one or more changes of direction of the conduit between the mixer and the conduit outlet, such as by providing one or more elbows or bends along the length of the conduit and also by enlarging a cross section of the flow stream of slurry in the conduit while at the same time changing the direction of the flow stream. In the known constructions, the enlargement of the flow stream and the changing of the direction of the flow stream take place simultaneously in a boot which forms a 90-degree elbow that has an increasing diameter throughout the 90-degree bend of the elbow. An exemplary wallboard mixer outlet boot is disclosed in commonly-assigned U.S. Pat. No. 8,475,762, which is incorporated by reference.

It has been found that, in many cases, even when using angled boots as described above, when the lower density core slurry is deposited upon the previously deposited, higher density slurry, at the point of impact of the later applied slurry upon the previously applied slurry, the denser slurry is subject to surface disruption, or "washout," which results in unsatisfactory panels.

Thus, there is a need to reduce or eliminate the above-identified washout in the production of gypsum wallboard panels.

SUMMARY

The above-listed needs are met or exceeded by the present gypsum slurry application modifier, which includes an adjustable clamping mechanism on the gypsum mixer outlet boot. The present device thus modifies the flow of gypsum slurry by compression of the outlet boot to create a more uniform spread of material onto the forming table. It is contemplated that an outlet boot has at least one boot leg. A feature of the clamping mechanism is that the slurry flow from a single boot leg is spread laterally expanding from a flow diameter of approximately 2.5 inches to approximately 5 inches measured where the respective flows of various boot legs (when present) fan out and merge together. This flow expansion, which is contemplated as varying depending on the amount of compression, the diameter of the boot leg, and the number of boot legs, among other things, while increasing slurry flow velocity at the outlet, reduces the mass of slurry deposited at a single point. Thus, the impact of the second slurry on the first slurry is spread out across a width of the first slurry, thus significantly reducing the unwanted washout. It is envisioned that the clamping mechanism is usable with slurry mixer boots having one or more legs (tubular outlets). In addition, the present device reduces the cost of creating wallboard panels by reducing the amount of water used to spread the slurry, reducing splashing of slurry on other production components, and reducing maintenance time of the mixer area.

More specifically, the present invention provides a gypsum slurry application modifier device is provided for use with a gypsum mixer outlet boot having at least one tubular outlet leg, and includes a support bracket mountable to the outlet boot; at least one clamp member associated with the support bracket and constructed and arranged for engaging the at least one tubular outlet leg of the outlet boot. Each at least one clamp member is constructed and arranged for exerting a vertical compression force on the associated at least one tubular outlet leg for expanding a slurry outlet flow from the at least one leg laterally beyond an exterior surface of the leg.

In another embodiment, a gypsum slurry modifier device is provided for use with a gypsum mixer outlet boot having at least one tubular outlet leg, and includes a support bracket mountable to the outlet boot, at least one clamp member associated with the at least one tubular leg and having a clamp base engaging a first surface of the leg and connected to the support bracket, and at least one pressure member connected to each clamp member and engaging a second, opposite surface of the leg from the first surface. An adjustment mechanism is associated with said support bracket and constructed and arranged for urging said at least one pressure member towards the clamp base of the clamp member.

DETAILED DESCRIPTION

Figure 1:
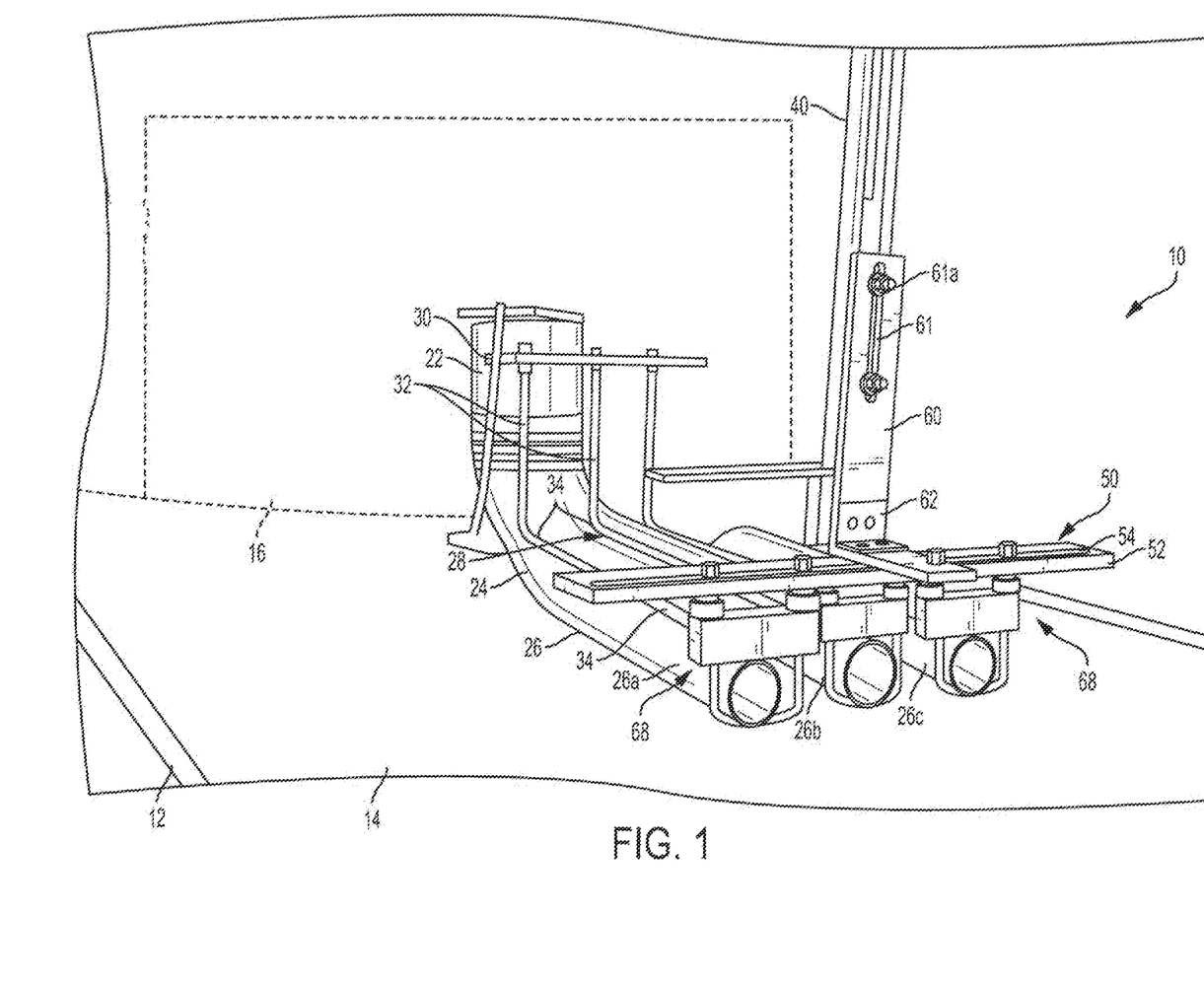
FIG. 1 is a front perspective view of a gypsum wallboard production line equipped with an outlet boot and the present gypsum slurry modifier device.

Referring now to FIG. 1, a gypsum wallboard production line is generally designated 10. As is known in the art, a support table 12 supports a moving endless conveyor belt 14. A slurry mixer 16 (shown schematically) is fixed in elevated relationship to the belt 14 and is similar to the mixers described in the patents identified above and incorporated by reference. Also as known in the art, an outlet boot 24 is securely mounted to the mixer outlet 22 and has at least one and preferably two or three outlet legs 26, presently designated 26a, 26b and 26c.

Figure 2:
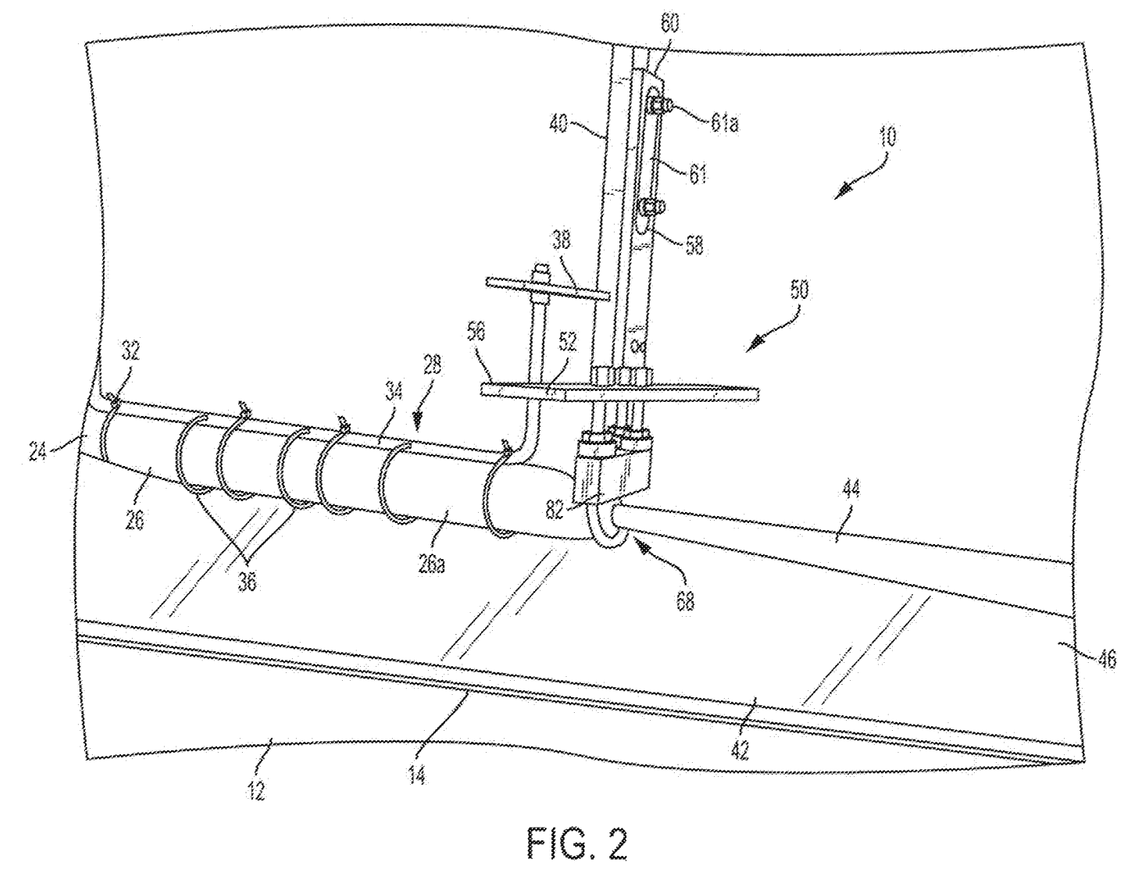
FIG. 2 is a fragmentary side elevation of the production line of FIG. 1, showing the present gypsum slurry modifier device.

Referring now to FIGS. 1 and 2, support for the outlet boot 24 is provided by an outlet boot bracket 28, including a ring 30 located near to, and optionally surrounding the mixer outlet 22, and a plurality of generally "U"-shaped support rods 32. Elongate portions 34 of the rods 32 are each secured to one of the outlet legs 26a, 26b, 26c preferably using cable ties or other suitable fasteners 36 (FIG. 2). Opposite the ring 30, vertically projecting ends 38 of the rods 32 are connected to a vertical support bracket 40 fixed to a suitable frame (not shown) as is well known in the art. Each of the rods 32 is movable laterally, or transverse to the direction of flow from the outlet legs 26, as well as vertically via adjustment of the rods relative to the support bracket 40.

It will be seen that in operation, the outlet boot 24 is held suspended above the conveyor belt 14, and also above a first layer 42 of gypsum slurry. In some types of gypsum wallboard formulation, this first layer 42, which forms an outer surface of the resulting wallboard panel, is provided with a higher density than a second slurry 44, emitted from the outlet legs 26 for deposit upon the first layer 42. As described above, in conventional wallboard production lines, it has been found that the velocity of the flow of the second slurry 44 causes an unwanted "washout" or disruption of the first layer 42 upon impact at a general location 46 (FIG. 2).

Referring now to FIGS. 3-6, in response to the above-described "washout" problem, the present gypsum slurry modifier device was developed, and is generally designated 50. Included on the modifier device 50 is a generally planar, elongate support bracket 52 being mountable to the mixer outlet boot 24 and having at least one elongate slot 54 extending relative to a longitudinal axis of the support bracket 52. In the preferred embodiment, there is a main slot 54 and a supplemental, shorter slot 54a disposed in spaced, parallel relation to the main slot.

Figure 7:
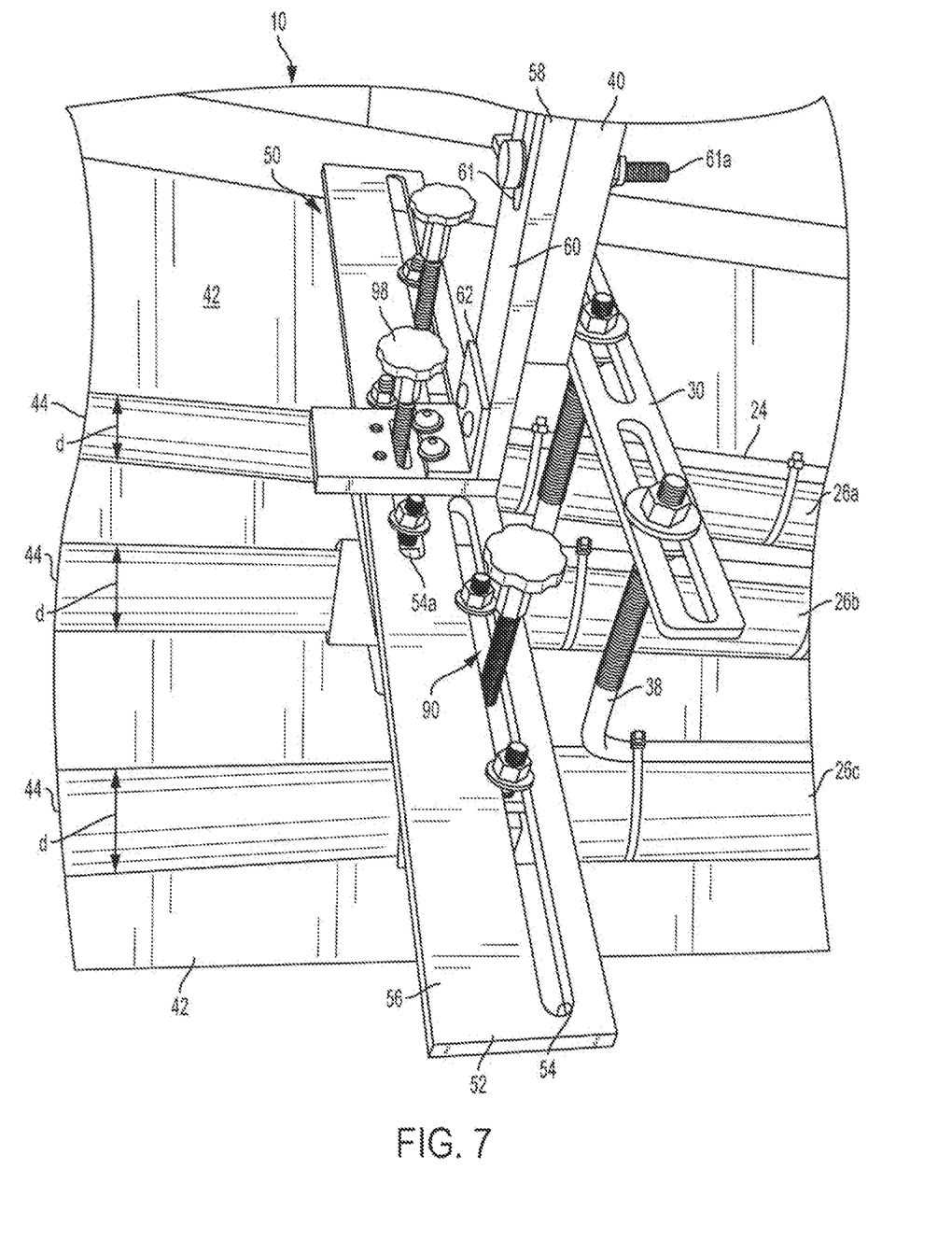
FIG. 7 is a fragmentary top perspective view of the present gypsum slurry modifier device of FIG. 1 shown in an unclamped position relative to the outlet boots.

More specifically, the support bracket 52 includes a first bracket member 56, having the slots 54, 54a and disposed transverse to a flow of liquid from the outlet legs 26, and a second bracket member 58 connected to the first member and including a vertically projecting arm 60 providing vertical adjustability to the first bracket member and to the at least one leg 26a, 26b, 26c associated with the bracket. A vertical slot 61 in the arm 60 provides for vertical adjustment of the device 50 relative to the vertical support bracket 40, using fasteners 61a (FIGS. 1, 7, 9) as is well known in the art. In the preferred embodiment, the second bracket member 58 is generally "L"-shaped and has a mounting fitting 62 configured for connecting the second bracket member to the first bracket member 56 using fasteners 64 such as screws or the like as is well known in the art. The mounting fitting 62 optionally has multiple apertures 66 (FIG. 3) for receiving the fasteners 64 for changing the relative positions of the first and second bracket members 56, 58.

Figure 8:
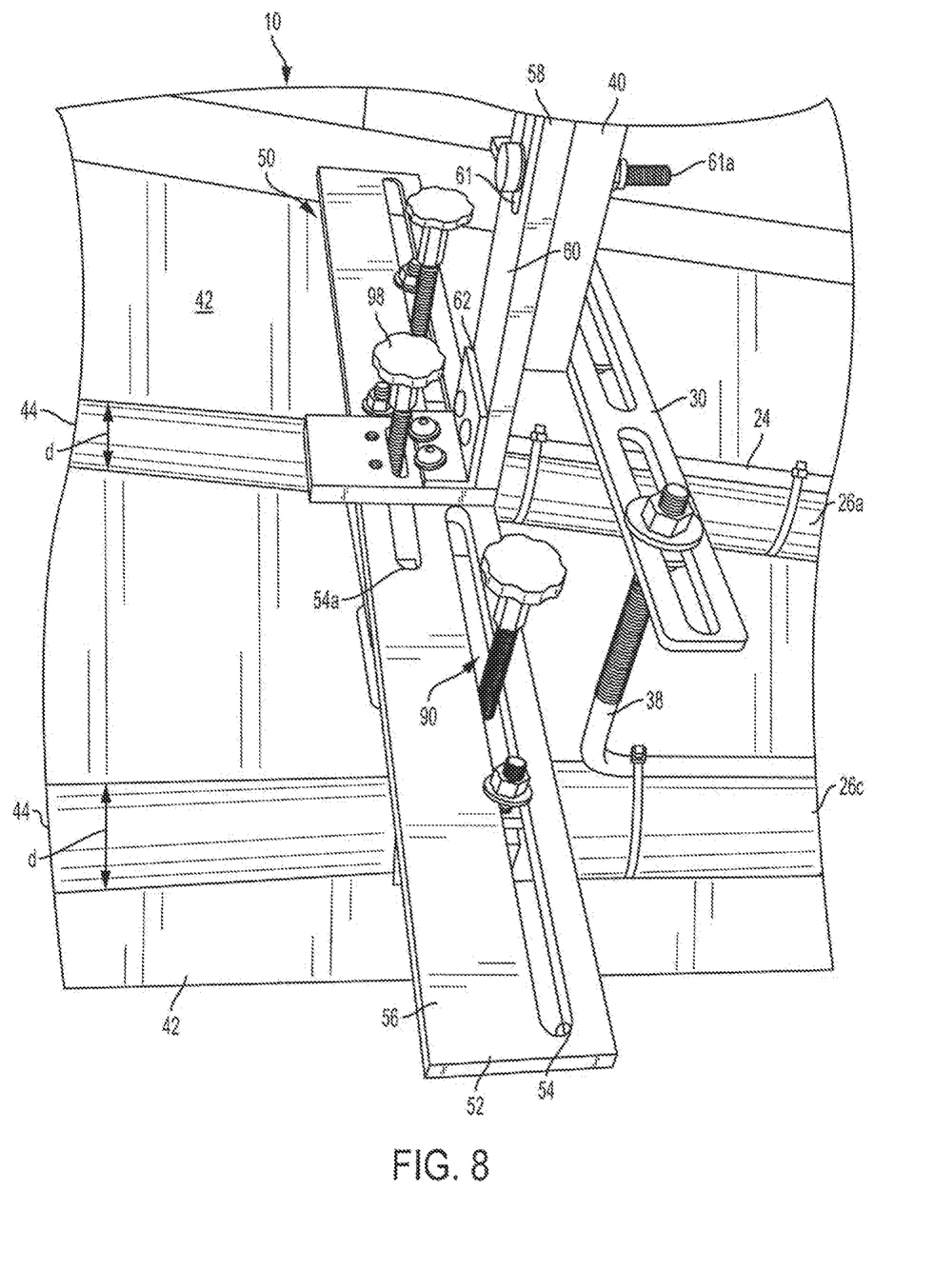
FIG. 8 is a fragmentary top perspective of the present gypsum slurry modifier device of FIG. 6 shown in an unclamped position relative to the outlet boots.

Referring again to FIGS. 3-6, at least one and preferably three clamp members 68 are associated with the support bracket 52 and are constructed and arranged for engaging the at least one tubular outlet leg 26a, 26b, 26c of the outlet boot 24. A feature of the present gypsum slurry modifier device 50 is that each of the clamp members 68 is constructed and arranged for exerting a vertical compression force on the associated tubular outlet leg 26a, 26b, 26c for expanding a slurry outlet flow from a relatively parallel flow from the outlet leg (FIGS. 7 and 8) to a flared or fanned out flow from the outlet leg (FIGS. 9 and 10) as will be described below in greater detail.

In the preferred embodiment, there are three clamp members 68, each associated with one of the outlet boot legs 26. However, it is also contemplated that a single clamp member 68 is configurable to engage all legs 26a 26b, 26c, or alternately that the number of clamp members may otherwise vary to suit the application. Also, it is generally contemplated that the number of clamp members 68 will correspond with the number of boot outlet legs 26. While other shapes are contemplated, such as semicircular, in the preferred embodiment, the clamp member 68 is generally "U"-shaped, with a pair of generally parallel, vertical uprights 70 spaced laterally by a clamp base 72 integrally formed with the uprights. Free ends 74 of the uprights 70 are secured to the support bracket 52 using a fastener bar 76 (FIGS. 5 and 6) disposed against an underside 78 of the bracket and suitable fasteners 80 such as nuts which engage the free ends 74 after passing through the elongate slots. As such, the clamp member 68 is vertically adjustable relative to the support bracket 52.

The clamp member 68 is provided with a pressure member 82 slidably disposed on the vertical uprights 70. In the preferred embodiment, the pressure member 82 s a block of solid self-supporting material such as Delrin® acetal resin or the like. The pressure member 82 should be sufficiently strong to exert an even compressive force on the respective at least one outlet leg 26 upon insertion of the leg into a space 84 defined between the clamp base 72 and a lower surface 86 of the pressure member 82. Preferably, the pressure member 82 has a pair of vertical through bores 88 (shown hidden) for slidably engaging the uprights 70.

Also included in the present gypsum slurry modifier device 50 is an adjustment mechanism 90 associated with the support bracket 52 and constructed and arranged for adjustably displacing the pressure member 82 towards the clamp base 72. Preferably, the adjustment mechanism 90 includes a threaded rod 92 passing through the slot 54 or 54*a*, threadably engaging the fastener bar 76, having an adjustment fastener 94 such as a nut, and then contacting an upper surface 96 of the pressure member 82, opposite the lower surface 86. It is also preferred that there is a threaded rod 92 for each clamp member 68, however the number and arrangement of such rods may vary to suit the situation. Since the adjustment mechanism 90 is adjustable by a user, the mechanism preferably includes a user-actuable knob 98. As such, rotation of the knob in a specified direction, such as clockwise, causes a free end 100 of the rod to depress the pressure member 82 closer to the respective leg 26*a*, 26*b*, 26*c*.

Figure 3:
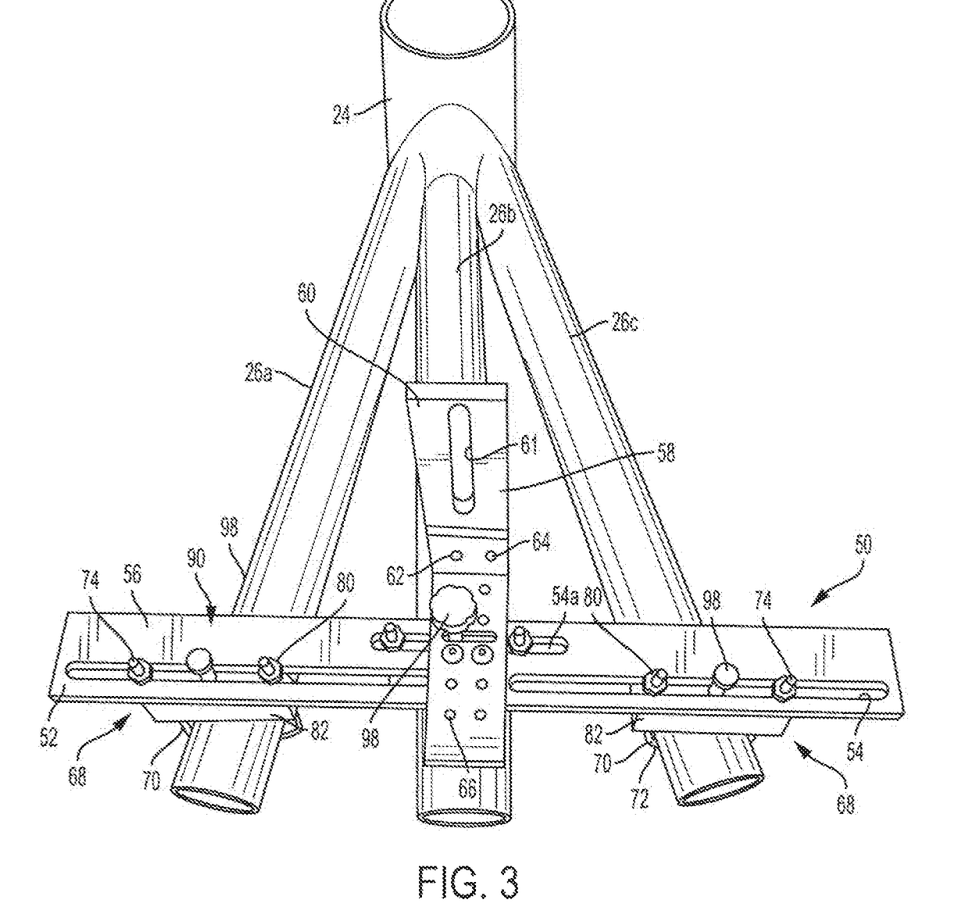
FIG. 3 is a top perspective view of the outlet boot of FIG. 1 shown equipped with the present gypsum slurry modifier device.
Figure 4:
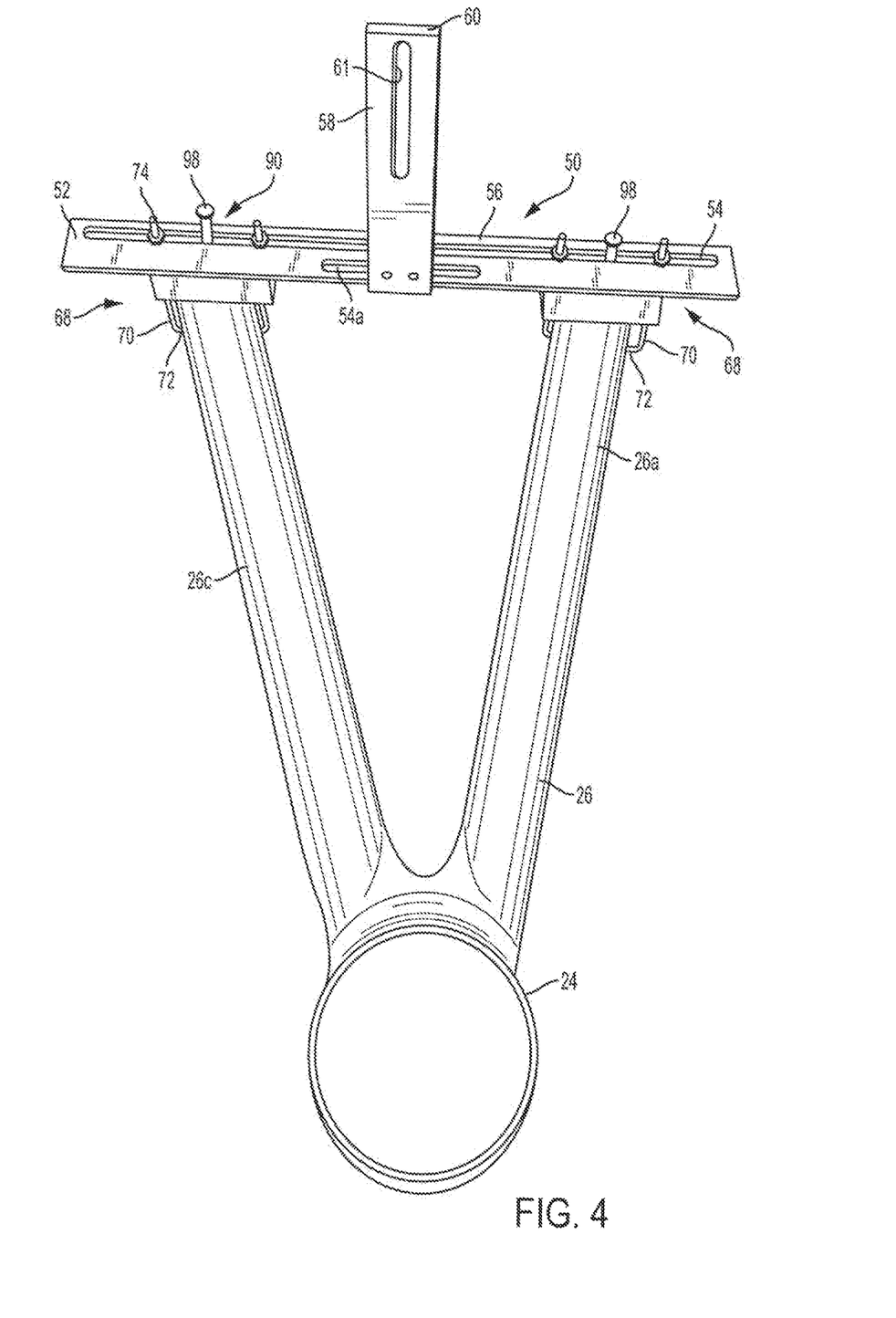
FIG. 4 is an overhead plan view of an alternate embodiment of the outlet boot equipped with the present gypsum slurry modifier device.
Figure 5:
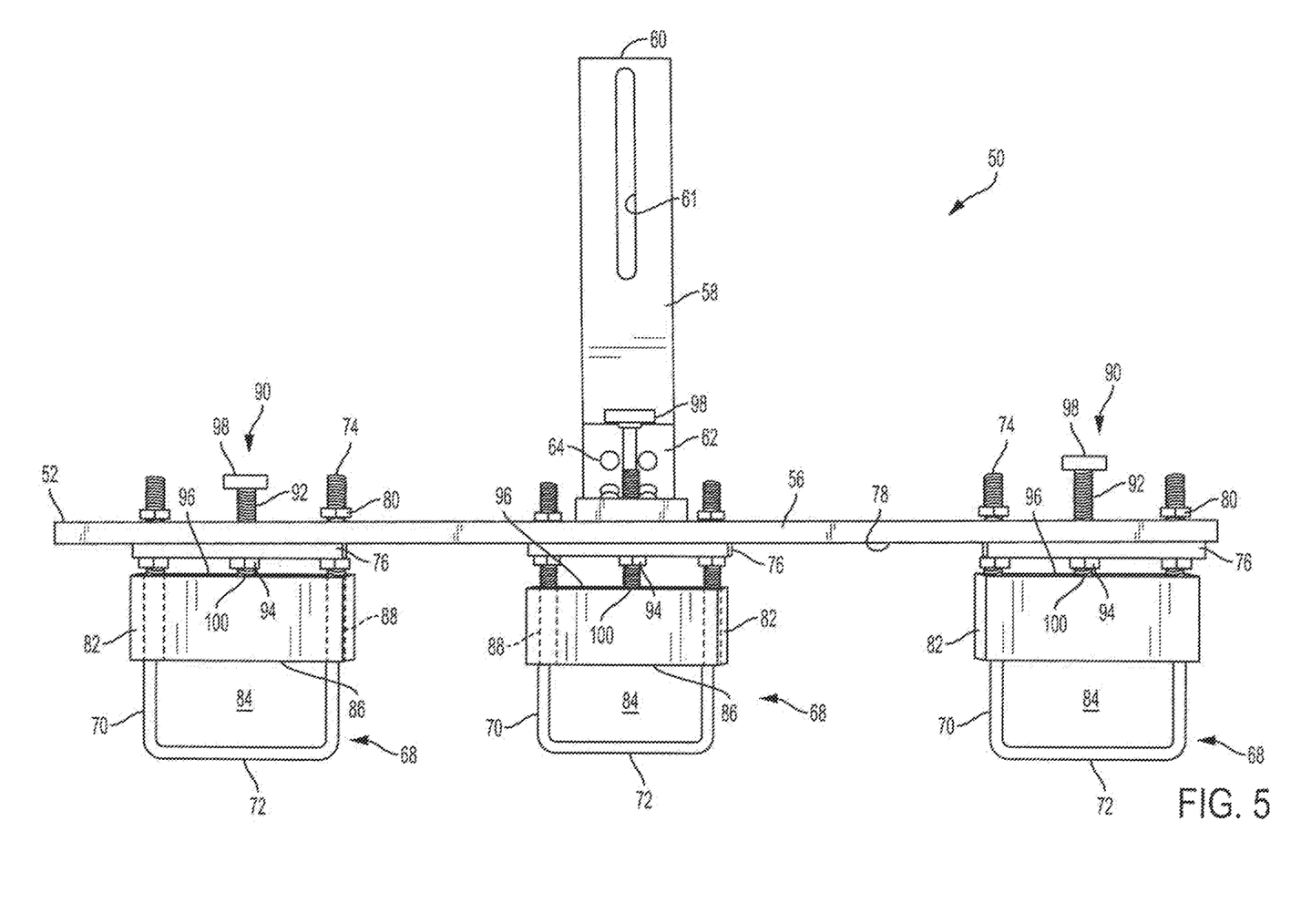
FIG. 5 is a front elevation of the present gypsum slurry modifier device.
Figure 6:
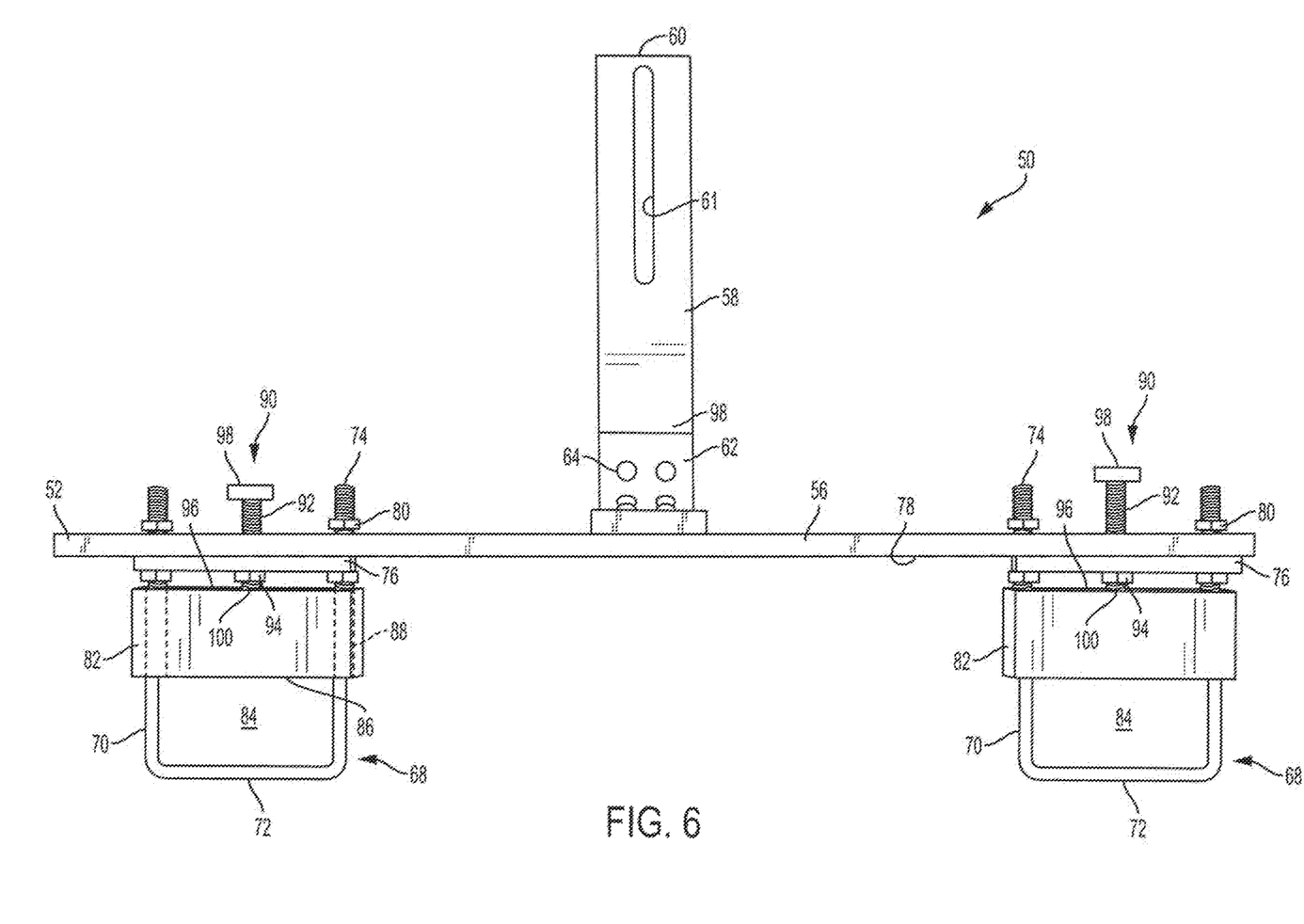
FIG. 6 is a front elevation of the present gypsum slurry modifier device configured for use with the boot of FIG. 4.

Referring now to FIGS. 1, 3 and 4, upon assembly to the mixer outlet boot 24, each of the legs 26*a*, 26*b*, 26*c* is inserted into the space 84 of the corresponding clamp member 68. Then, as the knob 98 is rotated in the predetermined direction, the pressure member 82 is urged towards the leg 26*a*, 26*b*, 26*c* and the leg will be compressed vertically to appropriately adjust the flow of the slurry 44 to reduce or preferably eliminate unwanted "washout". When it is desired to alter the angle of outlet of the slurry 44, the legs 26*a*, 26*b*, 26*c* are movable laterally by moving the clamp member 68 and the pressure member 82 along the slot 54. Note, and referring to FIG. 3, it is preferred that the legs 26*a* and 26*c* are slidably engaged via the clamp members 68 in the slot 54, while the leg 26*b* is slidably engaged via the corresponding clamp member in the slot 54*a*.

Figure 9:
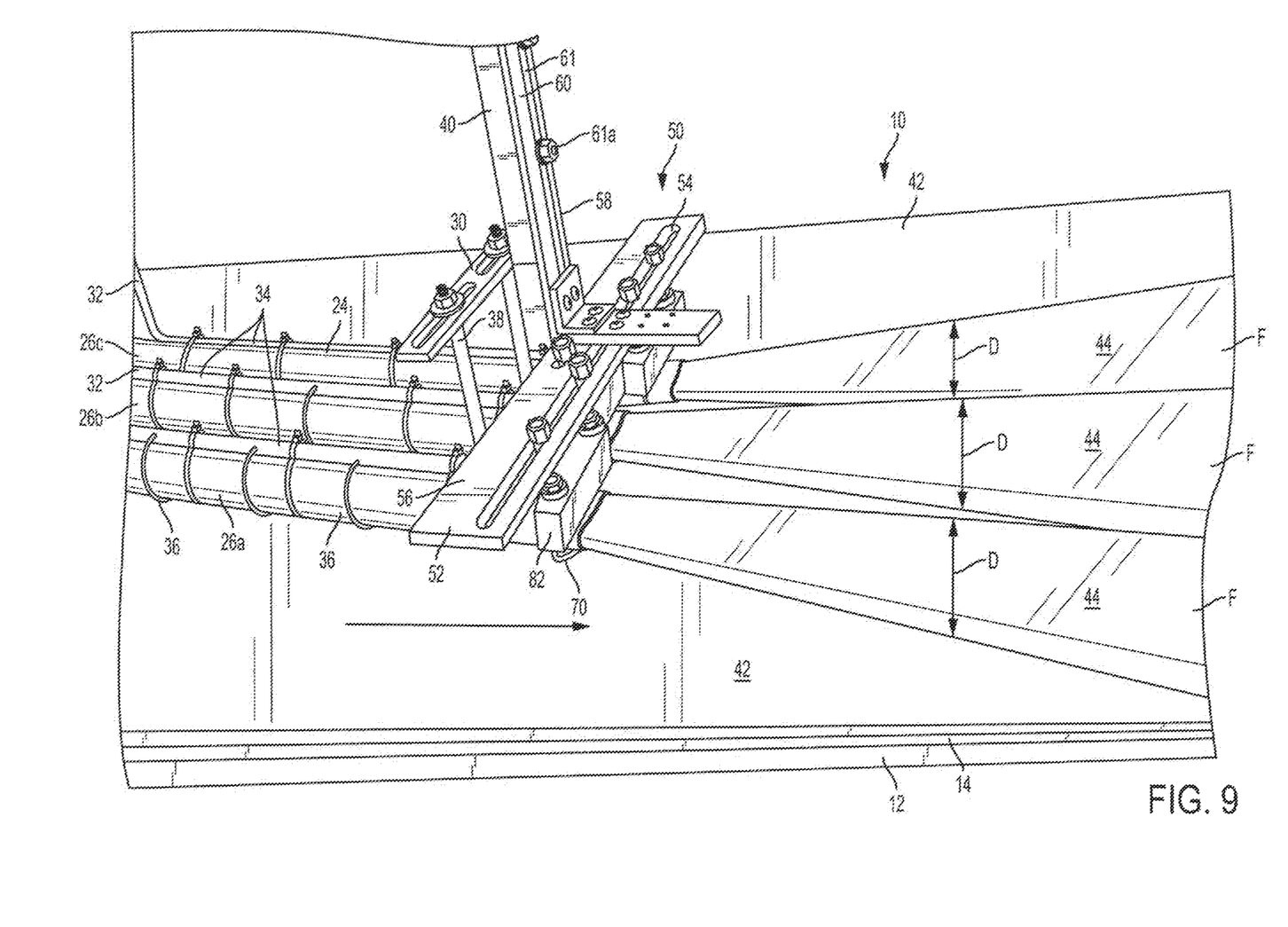
FIG. 9 is a fragmentary top perspective of the gypsum wallboard production line of FIG. 1 showing the present gypsum slurry modifier device adjusted to broaden the boot flow paths for reducing impact upon the previously deposited slurry.
Figure 10:
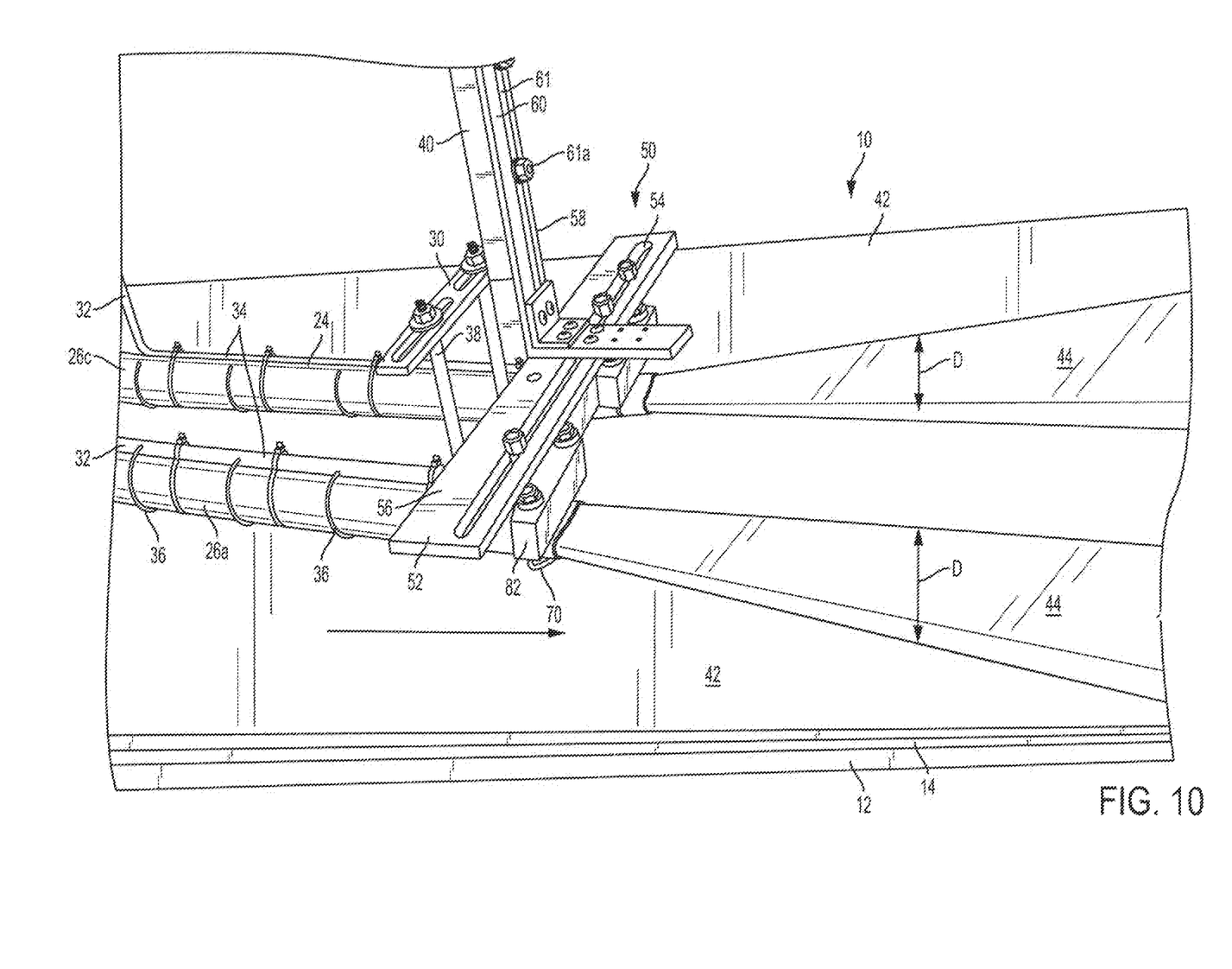
FIG. 10 is a fragmentary top perspective of the gypsum wallboard production line of FIG. 1 shown with the outlet boot of FIG. 4 and the present gypsum slurry modifier device of FIG. 6 adjusted to broaden the boot flow paths for reducing impact upon the previously deposited slurry.

Referring now to FIGS. 7-10, a comparison is shown of the flow patterns of the slurry 44 from the legs 26 of a conventional outlet boot 24 prior to compression by the present modifier device 50 (FIGS. 7 and 8), and the same outlet boot legs 26 compressed by the present gypsum slurry modifier 50 (FIGS. 9 and 10). It will be seen that without compression, each of the outlet boot legs 26*a*-26*c* emits a flow of the slurry 44 in a stream which generally corresponds to the diameter of the leg, shown as a distance "d", which is usually in the range of 2 to 2.5 inches. It is contemplated that this distance "d" may vary with the diameter of the leg as is known in the art. As described above, it has been found that when these streams impact the previous slurry 42, the impact has caused unwanted washout of the slurry.

Referring now to FIGS. 9 and 10, using the present modifier device 50, the flow pattern of the slurry 44 from each of the legs 26*a*-26*c* is formed into a generally flattened, flared pattern and is laterally increased to have a distance "D" of at least approximately 4-5 inches. It is contemplated that the distance "D" may vary with the amount of compression and the initial diameter of the leg. In other words, the slurry flow pattern from the legs 26*a*-26*c* expands laterally beyond an exterior surface of the legs. It is also seen that at some point after emission from the legs 26*a*-26*c*, the streams of the slurry 44 merge at point "F," especially when three outlet legs 26*a*-26*c* are provided. This merger, occurring in the general area of the impact point 46 of the slurry 44 upon the slurry 42, spreads out the impact forces, and significantly reduces the unwanted washout of the slurry 42. In FIG. 10, the flows of slurry 44 will still benefit from reduced impact at the impact point 46 (FIG. 2) even if the flows from adjacent legs 26 do not merge.

While a particular embodiment of the gypsum slurry application modifier has been described herein, it will be appreciated by those skilled in the art that changes and modifications may be made thereto without departing from the invention in its broader aspects and as set forth in the following claims.

The invention claimed is:

1. A gypsum slurry modifier device for use with a gypsum mixer outlet boot, comprising:
    an outlet boot having at least one tubular outlet leg;
    a support bracket mountable to the outlet boot and having an elongate slot for each at least one tubular outlet leg transverse to a flow of liquid from said at least one tubular outlet leg;
    at least one clamp member associated with said support bracket and constructed and arranged for engaging the at least one tubular outlet leg of the outlet boot, wherein the clamp member is associated with a distal end of the at least one tubular outlet leg;
    each said at least one clamp member including a pressure member and a clamp base exerting a vertical compression force on the associated at least one tubular outlet leg, with the at least one tubular outlet leg being disposed between the pressure member and said clamp base, such that as the leg is compressed, a slurry outlet flow from the at least one leg is expanded laterally beyond an exterior surface of the leg; and
    each said at least one clamp member is generally U-shaped, and is provided with the pressure member slidably disposed on vertical, parallel uprights for compressing the outlet leg held by the clamp base spacing said uprights, said uprights for each said at least one clamp member being adjustably secured to said support bracket through said elongate slot corresponding to the associated at least one tubular outlet leg,
    wherein each at least one clamp member is moveable transverse to the flow of liquid, relative to said support bracket, by moving said uprights in each associated elongate slot.

2. The device of claim 1, wherein the at least one outlet leg has an outside surface diameter ranging from 2 to 2.5 inches, and said clamp member being constructed and arranged for compressing the at least one leg for achieving a width of slurry flow in the range of 4-5 inches.

3. The device of claim 1, wherein the outlet boot has three legs, and said device includes three of said at least one clamp members, one for each of the legs.

4. The device of claim 1, further including an adjustment mechanism associated with said support bracket and constructed and arranged for adjustably displacing said pressure member towards said clamp base.

5. The device of claim 4, wherein said adjustment mechanism is a threaded rod engaging said support bracket and contacting a surface of the pressure member opposite a surface contacting the at least one outlet leg.

6. The device of claim 1, wherein said clamp member is vertically adjustable relative to said support bracket.

7. The device of claim 1, wherein said support bracket includes a first member disposed transverse to the flow of liquid from said at least one tubular outlet leg, and a second member connected to said first member and including a vertically projecting arm providing vertical adjustability to said first member and to the at least one leg associated with said bracket.

8. A gypsum slurry modifier device for use with a gypsum mixer outlet boot having at least one tubular outlet leg, comprising:
   a support bracket mountable to the outlet boot, said support bracket having an elongate slot for each at least one tubular outlet leg transverse to a flow of liquid from said at least one tubular outlet leg;
   at least one clamp member associated with said support bracket and constructed and arranged for engaging the at least one tubular outlet leg of the outlet boot, wherein the clamp member is associated with a distal end of the at least one tubular outlet leg;
   each said at least one clamp member exerting a vertical compression force on the associated at least one tubular outlet leg via a first surface of a pressure member across from, and aligned with, a second surface of a clamp base, with the at least one tubular outlet leg being disposed between the pressure member and said clamp base, such that a slurry outlet flow from the at least one leg is expanded laterally beyond an exterior surface of the leg, wherein the first surface and the second surface are parallel;
   the outlet boot has three legs, and said device includes three clamp members, one for each of the three legs; and
   each said at least one clamp member is generally U-shaped, and is provided with the pressure member slidably disposed on vertical, parallel uprights and actuated by a single fastener for compressing the outlet leg held by the clamp base spacing said uprights, said uprights for each said at least one clamp member being vertically adjustable relative to said support bracket, wherein the clamp base and said uprights form one unitary structure and said uprights are secured to said support bracket, wherein each at least one clamp member is moveable transverse to the flow of liquid, relative to said support bracket, by moving said uprights in each associated elongate slot.

9. A gypsum slurry modifier device for use with a gypsum mixer outlet boot having at least one tubular outlet leg, comprising:
   a support bracket mountable to the outlet boot, said support bracket having an elongate slot for each at least one tubular outlet leg transverse to a flow of liquid from said at least one tubular outlet leg;
   at least one clamp member associated with said support bracket and constructed and arranged for engaging the at least one tubular outlet leg of the outlet boot, wherein the clamp member is associated with a distal end of the at least one tubular outlet leg;
   each said at least one clamp member including a solid block and a clamp base exerting a vertical compression force on the associated at least one tubular outlet leg, with the at least one tubular outlet leg being disposed between the solid block and said clamp base, such that as the leg is compressed, a slurry outlet flow from the at least one leg is expanded laterally beyond an exterior surface of the leg; and
   each said clamp member is generally U-shaped, and is provided with the solid block slidably disposed on vertical, parallel uprights and actuated by a single fastener acting on an upper surface of the solid block for compressing the outlet leg held by the clamp base spacing said uprights, said uprights for each said clamp member being adjustably secured to said support bracket wherein each at least one clamp member is moveable transverse to the flow of liquid, relative to said support bracket, by moving said uprights in each associated elongate slot.

10. The device of claim 9, further including a threaded rod associated with said support bracket and constructed and arranged to threadably engage a fastener bar and an adjustment nut, wherein the threaded rod adjustably displaces the block when rotated.

* * * * *